United States Patent [19]
Bennett et al.

[11] Patent Number: 5,287,256
[45] Date of Patent: Feb. 15, 1994

[54] MARKER FOR EDGE LIGHTS

[75] Inventors: Reginald S. Bennett, Toronto; Gary Hretsina, Ajax, both of Canada

[73] Assignee: Reginald Bennett International Inc., Ajax, Canada

[21] Appl. No.: 46,266

[22] Filed: Apr. 6, 1993

[51] Int. Cl.⁵ ............................................. F21S 1/14
[52] U.S. Cl. ..................................... 362/152; 362/62; 362/253; 362/431
[58] Field of Search ............... 362/62, 84, 153.1, 234, 362/253, 431, 152

[56] References Cited

U.S. PATENT DOCUMENTS

| | | | |
|---|---|---|---|
| 2,298,224 | 10/1942 | Mudgett | 362/62 |
| 4,521,836 | 6/1985 | Puttemanns et al. | 362/62 X |
| 5,122,798 | 6/1992 | Kaolian | 362/62 X |

Primary Examiner—Stephen F. Husar

[57] ABSTRACT

An edge light marker provides a standard for attachment to an edge light mount with a retro-reflective sleeve slidable onto and off the standard. The sleeve is preferably make of limp constituency and is shaped by the standard.

20 Claims, 1 Drawing Sheet

U.S. Patent
Feb. 15, 1994
5,287,256
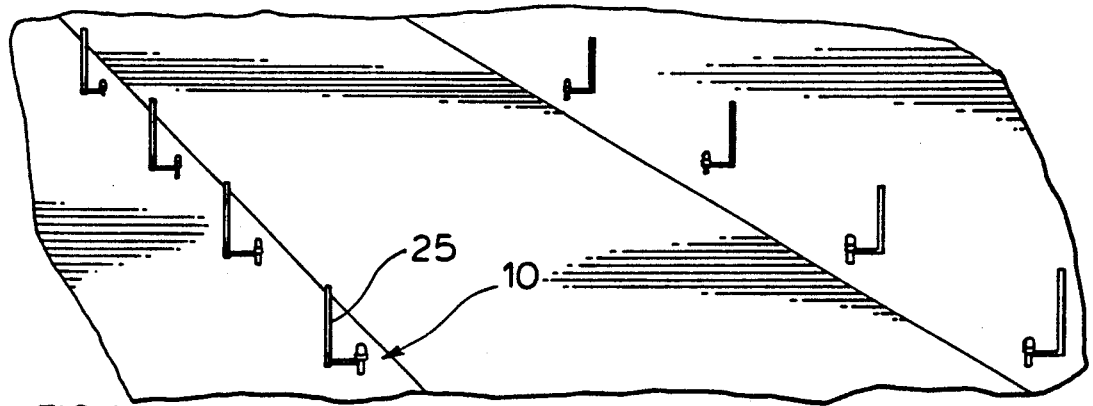
FIG.1.
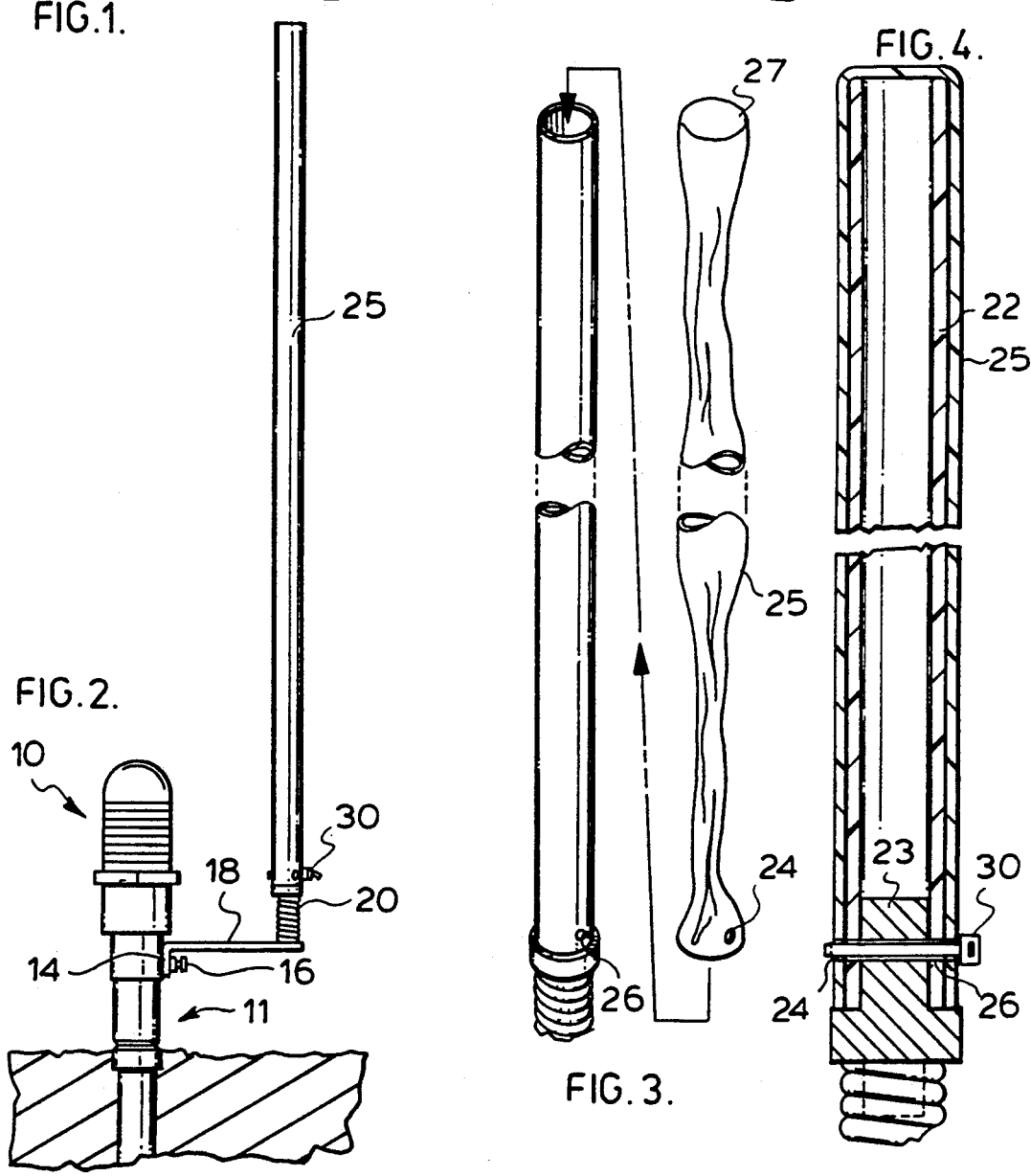
FIG.2.
FIG.3.
FIG.4.

MARKER FOR EDGE LIGHTS

This invention relates to an edge light marker. An edge light is a light, usually mounted on a ground surface, for delineating the edges of airport runways or taxiways or helicopter pads or for marking obstructions adjacent thereto.

Such edge lights, apart from their obvious lighting functions, have, in some instances, limited visibility in several situations. Such instances include: when they are covered with snow, in daytime, when they are turned off or when ground personnel are operating equipment such as a bulldozer with a restricted view of locations close both to the ground and to the vehicle. Such edge lights have in the past, frequently been marked with flags. However, the flags are almost invisible edge-on and are easily damaged or shredded or displaced by a strong slipstream.

It has therefore been found desireable that such edge light be provided with a marker which is easily visible in daytime and at night, under conditions such as those above-described and others.

By 'retrorelectant' mean the quality of reflecting a high proportion of incident light back along the incident path.

It is therefore an object of this invention to provide a marker for such edge lights which provides an upwardly directed standard adapted to attach to the edge light mount and to extend thereabove. A sleeve outwardly surfaced with retroreflective and preferably fluorescent material is dimensioned to be slid longitudinally onto and off said standard and is adapted to be supported thereby. The sleeve is preferably of an inexpensive and preferably of a limp construction, and if limp, is shaped by said standard.

The marker thus provided is itself more visible, under many conditions, than the edge light. With its fluorescent sleeve it retroreflects vehicular, aircraft and other lights. Thus under many conditions it alerts airport personnel to the presence of the edge light and hence lowers the risk of damage and also facilitates the locating of the edge light.

The retroreflectant sleeve is adapted to be slid onto and off the standard, so that it may be easily and cheaply replaced, without the necessity of replacing the entire standard.

Preferably the retroreflectant sleeve surface is fluorescent for better viewing, since a retroreflectant surface tends to be relatively inconspicuous when illuminated by ordinary daylight. Since the fluorescent quality of the sleeve tends to fade relatively rapidly, the easy sleeve replaceability becomes a material factor.

The standard is preferably round to support a limp sleeve in a cylindrical shape for best retroreflection and fluorescent visibility in all azimuthal directions.

Preferably the means for mounting the standard on the edge light mount is designed to allow temporary resilient deflection of the standard from an upright position. Thus the standard with its retroreflecting sleeve may be disturbed: by a vehicle impact, by wind or airflow from a propeller or helicopter and will temporarily deflect, and thereafter return to an upright position.

In drawings which illustrated a preferred embodiment of the invention:

FIG. 1 is an indication of a portion of a taxiway with edge lights thereon, carrying the invention markers, FIG. 2 is a side view of an edge light and marker, FIG. 3 demonstrates the application a limp sleeve to the marker standard, and FIG. 4 is a vertical section of a sleeve attached to a marker standard.

In the drawing, an edge light 10 is shown, and this may be electrically supplied by means not shown and its mount 11 embedded in a ground surface in any conventional manner, not shown.

A bracket 12 comprises a vertical extent 14 suitable for attachment by a bolt 16 to mount 11. At the upper end of vertical extent 14, when so attached, is an outwardly extending horizontal arm 18. The outer end of arm 18 mounts, in any suitable manner, the lower end of a coiled spring 20. Mounted on the upper end of coiled spring 20 in any suitable manner is a standard 22. The coil spring 20 and its mounts are arranged so that, without deflection pressure on standard 22, the spring 20 will hold standard 22 in an upright attitude. However, if the standard is temporarily deflected by mechanical or air pressure the spring will return the standard to vertical attitude when the force is removed.

The standard 22 preferably extends well above the edge light for easy visibility. I prefer to make the standard of a hollow polyurethane cylindrical tube which is strong enough to support itself and the sleeve to be placed thereon. The tube is preferably, distinctively coloured (orange is preferred) so that it may be easily located when the sleeve (to be described) is removed. The standard is preferably circular in section. The tube is preferably affixed to a plug 23 which in turn is mounted on spring 20.

Retroreflective limp material, preferably vinyl with a retroreflecting layer, is formed by well known techniques into a limp sleeve 25 with the retroreflecting layer on the outside. The limp sleeve is dimensioned with a periphery large enough so that it will easily slide longitudinally onto and off of the standard 22, but with a periphery small enough so that it is supported and shaped by the standard. The sleeve material will preferably be heat formed into a cap 27 to sit on the top of the standard and prevent the sleeve from sliding down.

The sleeve is long enough to cover the standard to the immediate vicinity of spring 20. A closure is formed in the upper end of the sleeve so that the upper end cannot slide below the top of the standard. Adjacent the lower end of the sleeve it is provided with opposed apertures 24. Standard 22 and plug 23 are provided with opposed apertures 26. Any conventional plastic tye 30 may therefore be threaded through the holes 24 and 26 when in registration and fastened to retain the lower end of the sleeve in position. To remove the sleeve the tye is usually cut, the sleeve slid off and a new tye provided when a new sleeve is installed.

The retroreflectant material, while it may be of any suitable type, is preferably the type with cube corner cavities in prismatic cells too small to be individually distinguished at ordinary viewing distances. I prefer to use the material of the cube corner reflectant type or film, manufactured by Reflexite Corporation of New Britain, Conn. under the trademark REFLEXITE.

With round standard 22 shaping the sleeve it will retroreflect incident light from all azimuthal directions.

The retroreflectant material will preferably be fluorescent as well as retroreflectant, such fluorescent retroreflective material being available from Reflexite Corporation under the trademark as discussed.

In use the standard 22 is mounted by its bracket on the mount 11 for edge light 10. A limp sleeve 25 is pulled over the standard and tied at tye 30. The edge light is now easily identifiable and locatable from all azimuthal directions.

If the standard is deflected by the force of wind, driven air or chance mechanical impact it will deflect resiliently under the force and spring back when the force is removed.

If the limp sleeve becomes damaged or if its fluorescence fades, then the sleeve may be quickly replaced by cutting the tye sliding the sleeve off, sliding on a new sleeve and tying it in place. The standard and its mount do not have to be replaced.

We claim:

1. Edge light marker, comprising:
   an upwardly extending standard,
   means for attaching said standard in upright attitude to an aviation edge light mount, and extending thereabove, a sleeve slidable longitudinally onto and off said standard,
   said sleeve being dimensioned to be supported by said standard,
   the outer surface of said sleeve being retroreflective.

2. Edge light marker as claimed in claim 1 wherein said standard defines a substantially round section.

3. Edge marker as claimed in claim 1 wherein said outer surface is fluorescent.

4. Edge marker as claimed in claim 2 wherein said outer surface is fluorescent.

5. Edge light standard as claimed in claim 1 wherein said means for attaching is connected to said standard by means allowing temporary resilient deflection of said standard from its upright orientation.

6. Edge light standard as claimed in claim 2 wherein said means for attaching is connected to said standard by means allowing temporary resilient deflection of said standard from its upright orientation.

7. Edge light standard as claimed in claim 3 wherein said means for attaching is connected to said standard by means allowing temporary resilient deflection of said standard from its upright orientation.

8. Edge light standard as claimed in claim 4 wherein said means for attaching is connected to said standard by means allowing temporary resilient deflection of said standard from its upright orientation.

9. Edge light marker as claimed in claim 1 wherein said sleeve is limp and adapted to be shaped by said standard.

10. Edge light marker as claimed in claim 2 wherein said sleeve is limp and adapted to be shaped by said standard.

11. Edge light marker as claimed in claim 3 wherein said sleeve is limp and adapted to be shaped by said standard.

12. Edge light marker as claimed in claim 4 wherein said sleeve is limp and adapted to be shaped by said standard.

13. Edge light marker as claimed in claim 5 wherein said sleeve is limp and adapted to be shaped by said standard.

14. Edge light marker as claimed in claim 6 wherein said sleeve is limp and adapted to be shaped by said standard.

15. Edge light marker as claimed in claim 7 wherein said sleeve is limp and adapted to be shaped by said standard.

16. Edge light marker as claimed in claim 8 wherein said sleeve is limp and adapted to be shaped by said standard.

17. In combination, aircraft edge light and marker therefor, said edge light including a mount for supporting said edge light relative to a ground surface,
   a marker comprising standard and means for attaching said standard to said mounting means adapted to support said standard in an upright orientation,
   a limp sleeve slidable longitudinally onto and off said standard,
   said sleeve being dimensioned to be shaped and supported by said standard, the outer surface of said sleeve being retroreflective.

18. The combination as claimed in claim 17 wherein said outer surface is fluorescent.

19. The combination as claimed in claim 18 wherein said standard is generally circular in section.

20. The combination as claimed in claim 18 wherein said means for attaching is connected to said standard by means allowing temporary resilient deflection of said standard from its upward orientation.

* * * * *